(12) United States Patent
Kuka et al.

(10) Patent No.: US 7,307,960 B2
(45) Date of Patent: Dec. 11, 2007

(54) METHOD AND DEVICE FOR DATA COMMUNICATION WITH A DATA PROCESSING DEVICE CONTROLLING AN ELECTRONIC DEVICE

(75) Inventors: Achim Kuka, Mannheim (DE); Georg Pfaff, Limburgerhof (DE)

(73) Assignee: Pepperl + GmbH, Mannheim (DE)

( * ) Notice: Subject to any disclaimer, the term of this patent is extended or adjusted under 35 U.S.C. 154(b) by 992 days.

(21) Appl. No.: 10/239,319

(22) PCT Filed: Mar. 19, 2001

(86) PCT No.: PCT/EP01/03101

§ 371 (c)(1),
(2), (4) Date: Sep. 19, 2002

(87) PCT Pub. No.: WO01/71667

PCT Pub. Date: Sep. 27, 2001

(65) Prior Publication Data

US 2003/0033027 A1    Feb. 13, 2003

(30) Foreign Application Priority Data

Mar. 20, 2000  (DE)  ............... 100 13 554

(51) Int. Cl.
 *G01R 31/08*  (2006.01)
(52) U.S. Cl. .................. 370/252; 340/870.02
(58) Field of Classification Search ............ None
See application file for complete search history.

(56) References Cited

U.S. PATENT DOCUMENTS

| 4,783,659 A | | 11/1988 | Frick |
| 5,083,288 A | | 1/1992 | Somlyody et al. |
| 5,621,731 A | * | 4/1997 | Dale et al. .................. 370/257 |
| 5,646,938 A | | 7/1997 | Wagener |
| 5,818,814 A | * | 10/1998 | Testani et al. .............. 370/212 |
| 6,647,301 B1 | * | 11/2003 | Sederlund et al. ........... 700/79 |
| 2005/0226201 A1 | * | 10/2005 | McMillin .................... 370/348 |

* cited by examiner

*Primary Examiner*—Phirin Sam
(74) *Attorney, Agent, or Firm*—Horst M. Kasper (57) ABSTRACT

The invention relates to a process for data input and data output into or out of an electronic data processing means that has an input to which a voltage is applied via a resistor and that is connected to the ground via an input switch, so that the voltage present at the input is higher than a specified voltage value when the input switch is open and lower than a specified voltage value when the input switch is closed, which is recognized by the software running in the electronic data processing means so that, by actuating the input switch, data can be input into the electronic data processing means. In a preferred embodiment that has an output line, the data can be input via the output line so that no separate line is needed. For this purpose, a digital output of the electronic data processing means is connected to the base of a transistor, while the input is connected to the ground via the collector of the transistor, the emitter of the transistor and the input switch, and the output line is connected to the emitter of the transistor.

23 Claims, 6 Drawing Sheets

METHOD AND DEVICE FOR DATA COMMUNICATION WITH A DATA PROCESSING DEVICE CONTROLLING AN ELECTRONIC DEVICE

TECHNICAL AREA

The invention relates to a process for data communication with an electronic data processing means that controls at least one electronic device like a sensor, such as a microcontroller or a programmable logic circuit, whereby said data processing means has an input and wherein a data processing program runs in a constant loop that cyclically queries whether a voltage that is higher or lower than a specified voltage value is present at the input, according to the generic part of claim 1, and the invention also relates to such a device according to the generic part of claim 17.

STATE OF THE ART

Electronic data processing means, e.g. microcontrollers, are often used for the software-assisted control of devices, e.g. measuring devices or sensors. In many cases, electronic data processing means used for such tasks have a volatile memory, e.g. a register, as well as a non-volatile memory, e.g. an EEPROM, that comprises a software program that serves to control and operate the system in question as well as any further data that might be needed.

If no possibility exists for data input into the electronic data processing means at its place of use, then a subsequent change of the memory contents is not possible without removing the system or parts thereof from its place of use. Furthermore, in cases where the system is encapsulated in a housing, the housing has to be opened for subsequent data input, as a result of which it usually has to be destroyed.

In many situations, it is desirable and advantageous to be able to subsequently input data from a remote site without removing the system from its place of use and without having to open a housing that might be present. Such a situation exists, for example, when a system has to be newly parameterized, calibrated, adjusted or set into a certain operational state.

For example, it can be necessary to influence a microcontroller that is installed in an inductive approximation sensor and that controls the operation of the sensor through the input of appropriate data from a remote site in order to make the microcontroller increase the sensitivity of the approximation sensor for a certain period of time and then to reduce it again, without having to subsequently dismantle the approximation sensor or parts thereof for this purpose and then having to bring them back to the place of use again. Likewise, it can be necessary to be able to neutralize an undesired shift of a parameter in a device by means of remote control.

In other cases, e.g. in monitoring systems, it can be desirable to be able to change certain parameters of the system through data input from a remote site without interrupting the operation of the system for a prolonged period of time.

Due to the often limited number of lines available for data input from a remote site, the possibility of serial data input is especially advantageous here, for example, via an RS232 interface. Drawbacks of this method are the necessary additional hardware resources and the need for an additional data line.

Another possibility for serial data input from a remote site is to equip the system with an infrared interface that receives signals in the form of electromagnetic radiation in the infrared spectral range or that emits such signals. Drawbacks of this method are the requisite complex hardware resources, the large space requirement for the necessary hardware as well as the need to keep the beam path free of dirt and hindrances. The latter disadvantage restricts the deployment possibilities of infrared interfaces.

German Patent No. 41°23°828 C2 describes a process for serial data input that is based on modulation of the operating voltage of the electronic data processing means and that can make do without additional data lines. Drawbacks of this method are the large hardware resources needed, the large space requirement for the hardware and the need to insert a programming device into the supply line.

German Preliminary Published Application No. 40°15°271 A1 discloses a circuitry with a microcomputer with which the position of a switch can be queried. One connection of the switch to be queried is linked to a fixed potential, while the other connection is linked to the microcomputer and to a resistor. The resistor can be connected, via a switch that can be controlled by the microcomputer, to a potential that differs from the fixed potential, whereby the microcomputer sets the controllable switch into the conductive state for at least the duration of the query.

German Patent No. 198°19°265 C1 describes a process to parameterize integrated circuitry in which a digital starting command signal with subsequent parameterization data in the form of a modulated voltage is applied to the supply voltage connection and/or to an output of the integrated circuitry. During the parameterization procedure, the modulated voltage is constantly higher than the normal operating voltage level of the integrated circuit.

German Patent Application No. 198°31°493 A1 discloses an optoelectronic sensor that has a parameterizable input/output via which data can be either input or output, depending on the parameterization.

Technical Task:

The invention is based on the task of providing a process and a device for bidirectional data communication with an electronic data processing means that controls an electronic device such as, for example, a sensor, from a remote site, so that the data processing means, for instance, parameterizes or adjusts the electronic device, whereby only minor additional hardware resources and especially no additional line or changes to the housing of the device should be needed.

This task is achieved according to the invention by a process for data communication with an electronic data processing means (1) that controls at least one electronic device (10), whereby said data processing means (1) has an input (2) and a digital output (3) via which data can be output and wherein a data processing program runs in a constant loop that cyclically queries whether a voltage that is higher or lower than a specified voltage value is present at the input (2).

whereby a voltage that is higher than a specified voltage value is applied via a resistor (20) to the input (2) that is connected via an input switch (50, 50a) to the ground (32) or to another voltage pole, so that the voltage drop at the resistor (20) is influenced by the switching state of the input switch (50, 50a) in such a way that the voltage present at the input (2) is higher than the specified voltage value when the input switch (50, 50a) is open and lower than the specified voltage value when the input switch (50, 50a) is closed, whereby the data processing program forms digital information on the basis of queries as to whether the voltage present at the input (2) is higher or lower than the specified voltage value, and said digital information can be output or it can control the electronic device (10), so that, by actuating the input switch (50, 50*a*), data can be input into the electronic data processing means (1), characterized in that

- ¥ the digital output (3) is connected to the control input (42) of an electronic switch (40) whose signal input (41) is connected to the input (2) and whose signal output (43) is connected to the ground (32) via the input switch (50, 50*a*),
- ¥ and the data input and the data output take place time-shifted vis- -vis each other through a shared output line (35).

The task is also achieved by a device for serial data communication with an electronic data processing means (1) that controls at least one electronic device (10), whereby said data processing means (1) has an input (2) and a digital output (3) via which data can be output and wherein a data processing program runs in a constant loop that cyclically queries whether a voltage that is higher or lower than a specified voltage value is present at the input (2), whereby a voltage that is higher than the specified voltage value is applied via a resistor (20) to the input (2) that is connected to the ground (32) via an input switch (50, 50*a*), so that the voltage drop at the resistor (20) is influenced by the switching state of the input switch (50, 50*a*) in such a way that the voltage present at the input (2) is higher than the specified voltage value when the input switch (50, 50*a*) is open and lower than the specified voltage value when the input switch (50, 50*a*) is closed, whereby the data processing program forms digital information on the basis of queries as to whether the voltage present at the input (2) is higher or lower than the specified voltage value, and said digital information can be output or it can control the electronic device (10), so that, by actuating the input switch (50, 50*a*), data can be input into the electronic data processing means (1), characterized in that

- ¥ the digital output (3) is connected to the control input (42) of an electronic switch (40) whose signal input (41) is connected to the input (2) and whose signal output (43) is connected to the ground (32) via the input switch (50, 50*a*),
- ¥ and the data input and the data output take place time-shifted vis- -vis each other through a shared output line (35).

Thus, depending on the switch position, a voltage that is higher or lower than that of the specified voltage value is present at the input of the electronic data processing means. The digital information formed on the basis of queries can be, for example, a digital word.

Accordingly, by actuating the input switch, a higher or lower voltage than the specified voltage value can be applied to the input of the electronic data processing means in any desired sequence. The software program cyclically queries whether the voltage present at the input is higher or lower than this specified voltage value or not.

Therefore, the electronic data processing means and the software program running therein function here as a detector for the voltage present at the input, thus for the current flow through the resistor and thus for the switch position.

The electronic device can be, for example, a sensor. The electronic data processing means can be, for example, a microcontroller or a programmable logic circuit.

In each case, the software program, as a function of a number of query results, forms digital information, for example, a digital word. In this manner, according to the invention, any desired digital information can be input into the data processing means which can then relay this data or else output it to the electronic device.

The input of the electronic data processing means can be, for example, a switching input, a data input, a signal input for analog or digital signals or an interrupt input.

In a preferred embodiment of the invention, the electronic data processing means has a low-active interrupt means and an interrupt input that is used as an input according to the generic parts of claims 1 and 17, whereby a voltage that is higher than the voltage value needed to activate the interrupt means is applied via a resistor to the interrupt input that is connected to the ground via an input switch, in such a way that the interrupt means is in the active state when the input switch is closed and is not in the active state when the input switch is open. In this embodiment of the invention, the specified voltage value according to the generic parts of claims 1 and 17 corresponds to the voltage value needed to activate the interrupt means.

The software is preferably configured in such a way that it responds every time in a specific manner to a specific piece of digital information or to a number of pieces of information that have been input in this manner. The transmitted digital information can be, for example, commands, numeric data, memory addresses or transfer addresses. The electronic device controlled by the data processing means can comprise a non-volatile erasable and programmable memory, e.g. an EEFPROM, and the software can be configured in such a way that the memory content of the non-volatile memory is changed through the input of certain digital information. In this manner, it can be achieved that certain data that is subsequently input, e.g. calibration values subsequently adapted to changed ambient conditions, is available after a restart of the system without the need for this data to be input again.

Moreover, the software can be configured in such a way that, as a barrier against input of data that is unintended or erroneous or that is caused by interference, the software initially only responds to one single specific digital word, i.e. a code word, and interprets this word as the command to receive additional commands and data. In this case, additional data can only be input after the code word has been entered.

The software can also be configured in such a way that, after the entry of another specific code word that the system interprets as the command do not receive any additional commands or data, the system goes back to the state in which it is blocked against unwanted data input. Another possibility is to configure the software in such a way that, after a specific code word has been received, the system is ready to receive further input for a certain period of time and then automatically returns to the operational state in which it is blocked against unwanted data input.

The input switch can be, for example, a mechanical switch or key that is activated manually. Of course, the input of digital words can only be done at a slow speed in this manner, although this can be sufficient for certain applications. Moreover, the input switch can also be an electronic switch by means of which a suitable means, for example, a microprocessor or computer, is actuated. The input switch can be located at a remote site with respect to the system and can be connected to the system via a separate input line.

According to the invention, however, in many cases, it is not necessary to provide a separate input line for purposes of serial input of data into an electronic data processing means from a remote site, as will be explained below.

In many cases, the electronic data processing means serves not only to control an electronic device, for example, a sensor or measuring system, but rather it concurrently fulfills the task of serially emitting a digital signal via a digital output and via an output line leading out of the system to a remote site continuously, at regular intervals or as needed. The digital signal can be, for example, a switching signal that is emitted by the system when a certain condition is met. The digital signal can also be, for example, a measured value that is supplied by a transducer or else a certain operational state in which the system is currently operating.

The output line leading to a remote site in these cases is used for the serial input of data into the data processing means in the manner described above so that, according to the invention, no separate line is required for this purpose.

In this embodiment of the invention, the electronic device controlled according to the invention by the electronic data processing means is additionally equipped with an electric or electronic switch, e.g. a transistor, that can be a bipolar transistor or a field effect transistor. The electric or electronic switch is connected between the input of the electronic data processing means and the input switch in such a way that the signal input of the electric or electronic switch is connected to the input of the electronic data processing means and the signal output of the electric or electronic switch is connected to the ground via the input switch, while the control input of the electric or electronic switch is connected to the digital output of the electronic data processing means of the output line.

In a preferred embodiment of the invention, the electric or electronic switch is a bipolar transistor or a field effect transistor that is connected between the input of the electronic data processing means and the input switch in such a way that the collector or drain terminal is connected to the input of the electronic data processing means and the emitter or source terminal is connected to the ground via the input switch, while the base or gate terminal is connected to the digital output of the electronic data processing means.

According to the invention, the output line is connected to the signal output of the electric or electronic switch or emitter of the bipolar transistor or source terminal of the field effect transistor. Therefore, the input switch, instead of being connected directly to the emitter or source terminal of the transistor, can be connected at a remote site to the output line. The electric or electronic switch or the transistor is configured in such a manner that it closes or establishes a connection when a high signal is present at the digital output of the electronic data processing means.

When the input switch is open, the signals emitted by the digital output of the electronic data processing means are output via the electric or electronic switch or transistor and via the output line. The signal input of the electric or electronic switch or of the collector or drain terminal of the transistor and thus the input of the electronic data processing means are practically insulated with respect to the ground when the input switch is open, so that the voltage drop at the resistor is slight. Therefore, via the resistor, a voltage that is higher than the specified voltage value is present at the input of the electronic data processing means.

When the input switch is closed, however, the signal output of the electric or electronic switch or the emitter or the source terminal of the transistor are short-circuited with respect to the ground. If, at the same time, a high signal is present at the digital output of the electronic data processing means, so that the electric or electronic switch opens or the transistor establishes a connection, then the signal input of the electric or electronic switch or of the collector or drain terminal of the transistor and thus also the input of the electronic data processing means are practically short-circuited with respect to the ground, so that such a great voltage drop occurs at the resistor that the voltage present at the input lies below the specified voltage value.

Consequently, in this embodiment of the invention, a serial input of data into the electronic data processing means is only possible by actuating the input switch if a high signal is present at the digital output of the electronic data processing means. The digital output can be made to emit a high signal in a number of different ways.

If the electronic device controlled by the data processing means is a sensor that emits a switching signal via the digital output when it is triggered, then one possibility is to trigger the sensor by systematically influencing the physical parameter it picks up.

A generally applicable possibility is to configure the software program in such a way that the digital output always immediately emits a high signal for a certain duration every time the electronic data processing means is switched on (cold start). In order to bring about the emission of a high signal at the digital output, in this case, the voltage supply to the electronic data processing means merely has to be briefly interrupted, for example, by means of an intermediate switch in the appropriate line.

Another generally applicable possibility is to configure the software program in such a way that the digital output emits a high signal of a certain duration at regular time intervals.

Another possibility is to equip the electronic data processing means with a non-locking key such that, when it is actuated, a high signal is emitted at the digital output. The non-locking key can be configured, for example, as an additional operating element of the electronic device that is controlled by the electronic data processing means.

In a preferred embodiment of the invention, the data is input serially.

In another embodiment of the invention, the electronic data processing means is equipped with a plurality of inputs, resistors and input switches so that data can be input in parallel through the parallel actuation of the input switch.

In another embodiment of the invention, the electronic data processing means also has a plurality of electric or electronic switches whose control inputs are each connected to one of the digital outputs of the electronic data processing means, whose signal inputs are each connected to an input and whose signal outputs are each connected to the ground via a dedicated input switch, so that parallel output and thus bidirectional parallel communication is also possible.

In one embodiment of the invention, these electric or electronic switches are bipolar transistors whose bases are each connected to a digital output of the electronic data processing means, whose collectors are each connected to an input and whose emitters are each connected to the ground via a dedicated input switch, or else they are field effect transistors whose gate terminals are each connected to a digital output of the electronic data processing means, whose drain terminals are each connected to an input and whose source terminals are each connected to the ground via a dedicated input switch.

In another embodiment of the invention, the electronic data processing means has a pair of antivalent outputs so that one of these outputs always emits a high signal when the other of these outputs emits a low signal and vice versa. Each of these outputs is connected to the control input of a dedicated electric or electronic switch, whereby the signal inputs of the two electric or electronic switches are connected to each other and to the input of the electronic data processing means. The signal outputs of the two electric or electronic switches are likewise connected to each other and to the signal input of the input switch. Since a high signal is thus always present at the control input of one of the two electric or electronic switches, data can always be transmitted to the input of the electronic data processing means by actuating the input switch.

In one embodiment of the invention, the input of the electronic data processing means as well as its supply voltage connection are connected via suitable level transducers, so that the operating voltage of the system can be much higher than that of the electronic data processing means. Here, the electronic switch is advantageously configured so that it can undertake a level adjustment.

In another embodiment of the invention, a push-pull principle is used, which will be explained below.

The software can be configured in such a way that the electronic data processing means can output not only measuring or switching signals via the digital output but also a response as a reaction to the input of digital words described above. As a result, for example, a possibility can be provided to immediately monitor the reaction of the system to a data input.

For example, by entering a command to this effect, the electronic data processing means can be made to carry out a system self-test and subsequently, by entering additional commands, to output the results of the test. In another example, a user can cause the electronic data processing means to inform the user about any currently present special operational states, error functions or about momentary internal parameters. In another example, an appropriate input can be used to systematically retrieve specific data such as, for example, the content of a certain memory address, from the system, which can be helpful, for instance, for a remote diagnosis of the system in case of operational malfunctions.

The software is preferably configured in such a way that the input of a certain code word sets the system into a communication mode in which the output of routine digital signals such as, for example, switching signals or measured values is interrupted in order to avoid interference with the digital signals that are possibly being output by the system as a response to an input. Here, the communication mode can only be exited and the output of the routine digital signals can only be resumed once a command to this effect has been entered. Another possibility is to configure the software in such a way that the system autonomously exits the communication mode once no further input is entered during a defined period of time.

Furthermore, the software can be configured in such a way that the digital signals to be routinely emitted are temporarily stored in a memory as long as the system is in the communication mode.

The invention has the advantages that it allows a parameterization and an adjustment of devices such as sensors with microcontrollers, without the need for additional hardware resources, and communication can also take place during operation; likewise, the device can be encapsulated. The parameterization of a device can also be carried out by the customer/user. The process is simple to implement and the device has simple circuitry. By the same token, no additional electric connections are necessary.

Brief description of the drawing in which preferred embodiments of the invention are represented schematically. The following is shown.

METHODS OF EXECUTION

Below, a number of variants of an embodiment of the invention will be explained in which the electronic data processing means is a microcontroller with a low-active interrupt means and an interrupt input, i.e. the interrupt means is activated when the voltage present at the interrupt input is less than a specified voltage value, and the interrupt means is not activated when the voltage present at the interrupt input is higher than the specified voltage value. The interrupt input is used as the input according to the generic parts of claims 1 and 17. In the explained embodiment of the invention, the microcontroller controls one sensor in each case.

Figure 1:
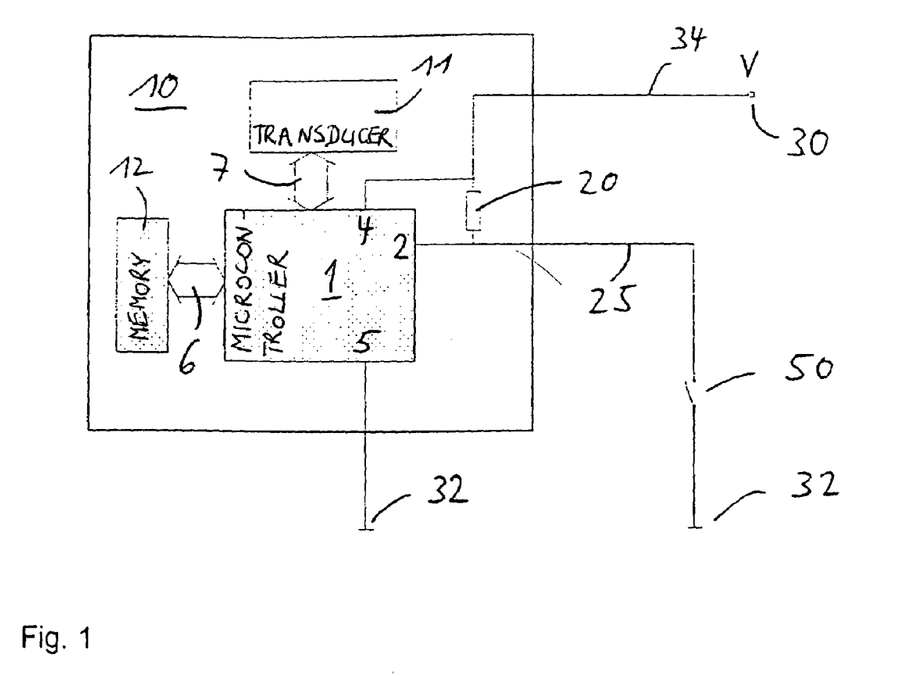
FIG. 1 a schematic circuit for serial data input into a microcontroller according to an embodiment of the invention, FIG. 2 a schematic circuit for serial data input and data output into or out of a microcontroller according to another embodiment of the invention, FIG. 3 a schematic circuit for serial data input and data output into or out of a microcontroller according to another embodiment of the invention, and FIG. 4 a schematic circuit for serial data input and data output into or out of a microcontroller according to a preferred embodiment of the invention, FIG. 5 a schematic circuit for serial data input and data output into or out of a microcontroller according to an embodiment of the invention based on a push-pull principle, and FIG. 6 a schematic circuit for serial data input and data output into or out of a microcontroller according to another embodiment of the invention.

FIG. 1 shows a block diagram for serial data input into a microcontroller 1. The microcontroller 1 controls a sensor 10 and is connected via a bus or line 6 to a memory 12 and via another bus or line 7 to a transducer 11 for the physical quantities picked up by the sensor 10. The transducer 11 can be, for example, an inductive approximation switch or an electric temperature transducer. The microcontroller 1 is also connected via a connector for supply voltage 4 and a supply line 34 to a voltage source 30 having the voltage V and to the ground 32 via a ground connection 5.

The interrupt input 2 of the microcontroller 1 is connected via a resistor 20 to the voltage source 30. At the same time, the interrupt input 2 of the microcontroller 1 in the embodiment shown in FIG. 1 is connected to an input line 25 that is connected to the ground 32 via the input switch 50 situated at a remote site.

Since the input resistance of the interrupt input 2 is relatively high ohmic, if the ohm value of the resistor 20 is properly selected, then the voltage supplied by the voltage source 30 is present at the interrupt input 2 in approximately its full strength, as long as the input switch 50 is open. In this case, the interrupt means of the microcontroller 1 is not active since it is low-active according to the embodiment explained here.

In contrast, if the input switch 50 is closed, a short circuit is present between the interrupt input 2 and the ground 32. The voltage V drops almost completely at the resistor 20, so that there is practically no voltage at the interrupt input 2. In this case, the interrupt means of the microcontroller 1 is active according to the embodiment of the invention explained here.

Therefore, by actuating the input switch 50, as described above, if the software running in the microcontroller 1 is appropriately configured, then data can be input into the microcontroller 1 via the input line 25 from a remote site, and said data is transmitted to the sensor 10 according to the program or it can correspondingly control or influence said sensor.

Figure 2:
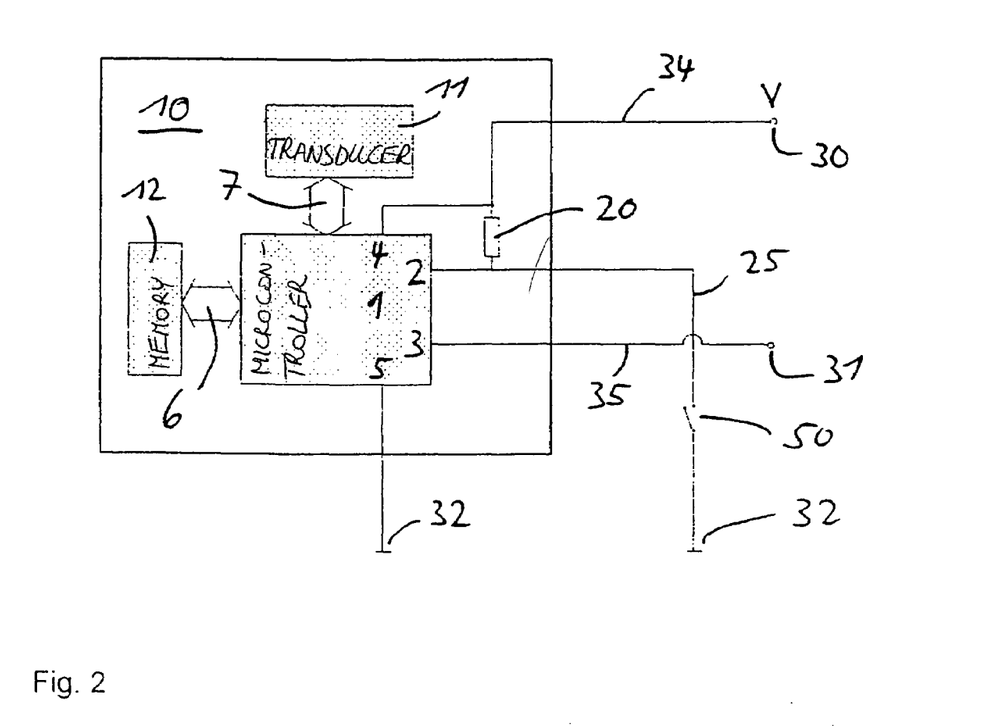

FIG. 2 shows a block diagram for serial data input into a microcontroller 1 according to another embodiment of the invention. As compared to the circuit of FIG. 1, the circuit of FIG. 2 additionally has an output line 35 that is connected to a digital output 3 of the microcontroller 1 and that serves to emit digital signals from the microcontroller 1. These digital signals can be, for example, measured values provided by the transducer 11 of the sensor 10. The digital signals emitted by the microcontroller 1 are available via the output line 35 to a terminal 31 at a remote site.

The software of the microcontroller 1 is now configured in such a way that the microcontroller 1 emits digital signals in response to an input of certain digital words via the input line 25 through the digital output 3 and the output line 35, on the basis of which the reaction of the sensor to the input can be monitored.

In many systems, an output line 35 is installed as a standard option so that the additional installation of an output line 35 is not necessary.

Figure 3:
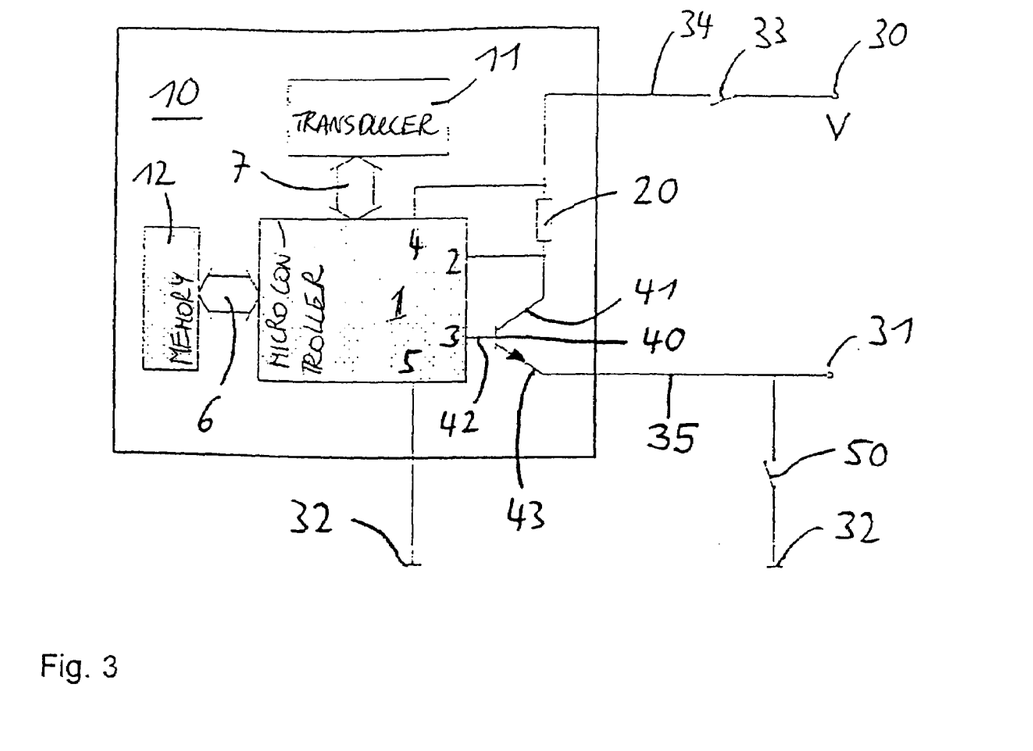
Figure 4:
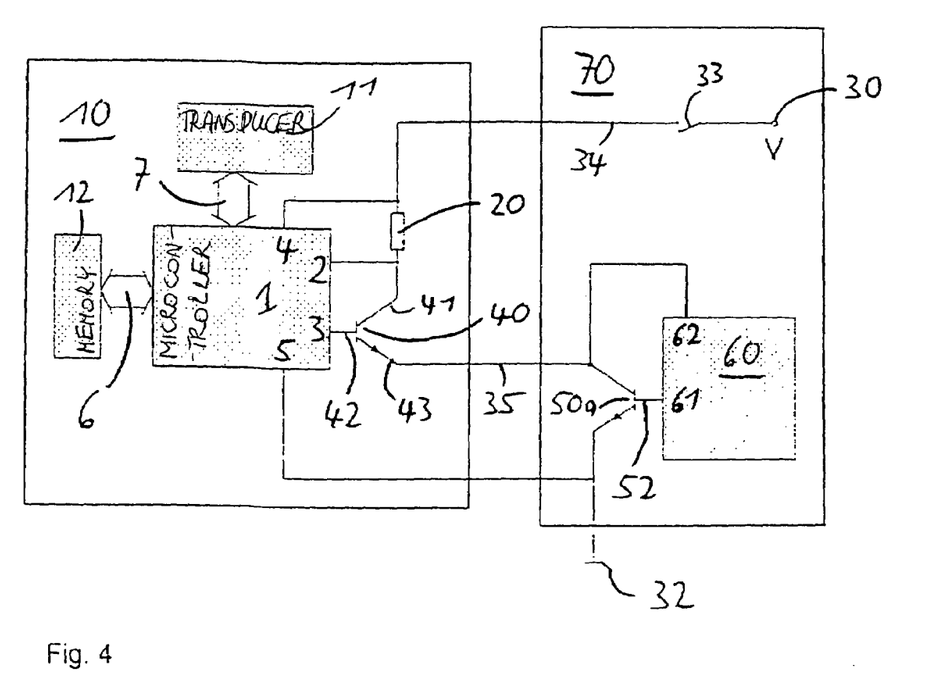

FIGS. 3 to 4 show embodiments of the invention in which transistors are used as electronic switches.

FIG. 3 shows another block diagram for serial data input into a microcontroller 1 in which, unlike the embodiments shown in FIGS. 1 and 2, advantageously no separate input line 25 is needed. The sensor 10 additionally has a transistor 40 that is a bipolar transistor with a collector 41, a base 42 and an emitter 43. In another embodiment, the transistor 40 is a field effect transistor with a drain, a gate and a source.

According to the invention, in the embodiment shown in FIG. 3, the base 42 is connected to the digital output 3 of the microcontroller 1, the collector 41 is connected to the interrupt input 2 of the microcontroller 1 and the emitter 43 is connected to the output line 35. In the embodiment shown in FIG. 3, the output line 35 is connected to the ground 32 via the input switch 50 that can be located at a remote site. Consequently, in contrast to the embodiments shown in FIGS. 1 and 2, in the embodiment shown in FIG. 3, the interrupt input 2 is connected to the ground 32 via the detour through the collector-emitter path of the transistor 40 via the input switch 50. The transistor 40 is configured in such a way that it establishes a connection when a high signal is present at the digital output 3 of the electronic data processing means 1, said high signal thus being present at the base 42 of the transistor 40.

When the input switch 50 is open, the digital output 3 of the microcontroller 1 can emit digital signals via the transistor 40 and via the output line 35 to a terminal 31. In this case, the interrupt means of the microcontroller 1 is not active.

When the input switch is closed, however, the emitter 43 of the transistor 20 is short-circuited with respect to the ground 32. If, at the same time, a high signal is present at the digital output 3 of the electronic data processing means 1, then, according to the invention, the collector 42 of the transistor 40 and thus the interrupt input 2 of the electronic data processing means 1 are practically short-circuited with respect to the ground 32. In this case, the interrupt means of the microcontroller 1 is active.

The digital output can be made to emit a high signal in a number of different ways, as was already explained above. By actuating the input switch 50, digital words can be entered into the microcontroller 1 as described above, whereby according to the invention, the output line 35 is used not only to output but also to input data, so that advantageously, a dedicated input line 35 (FIG. 1, FIG. 2) is not necessary.

As already explained above, in many cases, an output line 35 is already installed as a standard option. In these cases, according to the invention, input of data into the microcontroller 1 is advantageously possible without an additional line.

FIG. 4 shows a block diagram for serial data communication with a microcontroller 1 according to a preferred embodiment of the invention in which the input switch 50 of FIG. 3 has been replaced by an electronic input switch 50 a having a control connection 52. The electronic input switch 50a is actuated by switching signals that are transmitted to the control connection 52 of the electronic input switch 50 a by a control logic circuit 60 contained in a programming device 70 via a switching output 61. If a high signal is present at the digital output 3 of the microcontroller 1, then the interrupt means of the microcontroller 1 can be activated and deactivated by means of the control logic circuit 60.

The control logic circuit 60 is configured in such a way that, via the switching output 61, it emits switching signals in a sequence corresponding to the data to be input into the microcontroller. For this purpose, in a preferred embodiment of the invention, the control logic circuit 60 comprises a separate means for electronic data processing, e.g. a microprocessor or a computer, whereby the electronic input switch 50a is controlled by means of a suitable program. In a preferred embodiment of the invention, the data to be input into the microcontroller 1 can be input directly into the control logic circuit 60, for example, by means of a keyboard, or it can be retrieved from a memory or generated by means of software within the control logic circuit 60.

When the input switch 50a is open, the digital output 3 of the microcontroller 1 can emit digital signals to a terminal 31 (not shown in FIG. 4) via the transistor 40 and the output line 35. In an embodiment of the invention, the digital signals are not emitted to a terminal 31 but rather, for purposes of further processing and/or further use, they are transferred to the control logic circuit 60 via a control logic circuit input 62.

The digital output 3 can be made to emit a high signal in a number of different ways, as was already explained above. The software program can be configured in such a way that the digital output 3 always immediately emits a high signal for a certain period of time every time the electronic data processing means 1 is switched on (cold start). In order to bring about the emission of a high signal at the digital output 3, in this embodiment, the voltage supply to the electronic data processing means 1 merely has to be briefly interrupted, for example, by means of an intermediate switch 33 in the supply voltage line 34.

Therefore, by actuating the input switch 50, 50a, digital words can be entered into the microcontroller 1 as described above, whereby in the embodiments of the invention explained with reference to FIGS. 3 and 4, the output line 35 according to the invention is not only used to output but also to input data, so that advantageously, a dedicated input line 35 (FIG. 1, FIG. 2) is not necessary.

Figure 5:
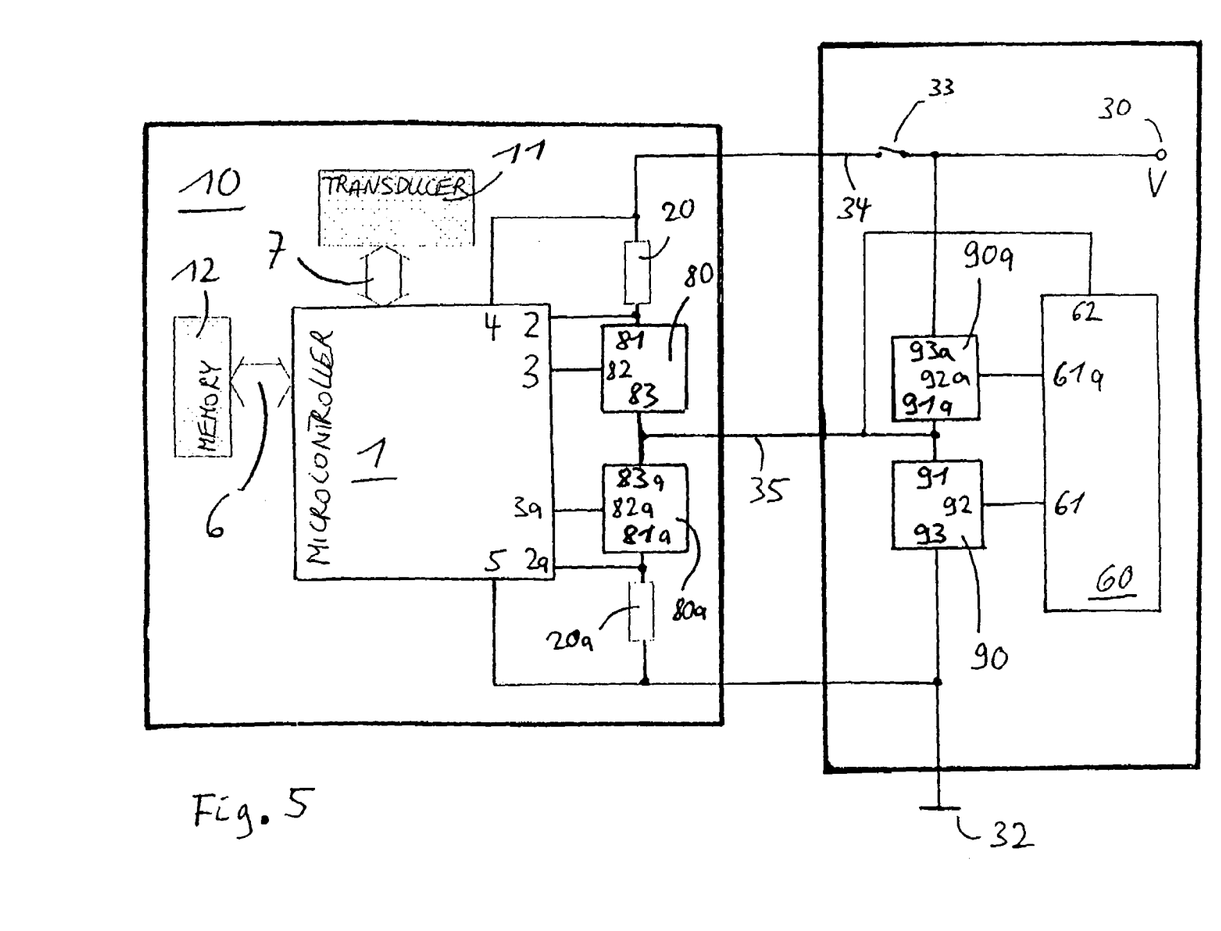

FIG. 5 shows a schematic circuit for serial data input and data output into or out of a microcontroller according to an embodiment of the invention based on a push-pull principle.

In this embodiment of the invention, the microcontroller 1 has two inputs 2, 2a, which are preferably interrupt inputs, as well as two digital outputs 3, 3a, which are configured in such a way that one always emits a high signal when the other output emits a low signal and vice versa. Each of the outputs 3, 3a is connected to the control input 82, 82a of a dedicated electric or electronic switch 80, 80a. This embodiment of the invention also has two resistors 20, 20a and two electronic input switches 90, 90a whose control inputs 91, 91a are each actuated by a dedicated output 61, 61a of the control logic circuit 60.

The signal input 81 of the first electronic switch 80 is connected to the first input 2 and, via the first resistor 20, to the supply voltage 30.

The signal input 81a of the second electronic switch 80a is connected to the second input 2a and to the ground 32 via the second resistor 20a. The signal output 83 of the first electronic switch 80 is connected to the signal output 83a of the second electronic switch 80a and, via the output line 35, to the signal inputs 91, 91a of the input switches 90, 90a. The signal output 93 of the first input switch 90 is connected to the ground 32. The signal output 93a of the second input switch 90a is connected to the supply voltage 30.

In every state of the microcontroller 1, one of the digital outputs 3, 3a emits a high signal so that always one of the electronic switches 80, 80a is closed or if a connection has been established. If the first electronic switch 80 is closed or if a connection has been established, then data can be input into the first input 2 by actuating the first input switch 90. If the second electronic switch 80a is closed or if a connection has been established, then data can be input into the second input 2a by actuating the second input switch 90a. Therefore, according to the invention, with the circuit shown in FIG. 5, data input is possible at any time, presupposing the suitable programming of the microcontroller 1, especially querying of the particular input 2, 2a.

In a preferred embodiment of the invention, by measuring the current flow through its outputs 61, 61a, the control logic circuit 60 automatically determines which of the two electronic switches 80, 80a is currently open and ensures that only the appropriate input switch is actuated during the data input.

As already explained above, in such cases in which it is the task of the electronic device 10 to emit digital signals such as, for example, a switching signal or measured values, an output line 35 for the proper operation of the: electronic device 10 is necessary anyway. In these cases, according to the embodiments of the invention explained with reference to FIGS. 3 to 5, data input and data output into or out of the microcontroller 1 are advantageously possible from a remote site, even without an additional line.

In another embodiment of the invention (FIG. 6). the electronic data processing means 1 has a pair of antivalent outputs 3, 3a so that one of these outputs 3, 3a always emits a high signal when the other of these outputs 3, 3a emits a low signal and vice versa. Each of these outputs 3, 3a is connected to the control input of a dedicated electric or electronic switch 101, 102, whereby the signal inputs of the two electric or electronic switches 101, 102 are connected to each other and to the input 2 of the electronic data processing means 1. The signal outputs of the two electric or electronic switches 101, 102 are likewise connected to each other and to the signal input of the input switch 50a. Since a high signal is thus always present at the control input of one of the two electric or electronic switches 101, 102, data can always be sent to the input of the electronic data processing means 1 by actuating the input switch 50a.

Figure 6:
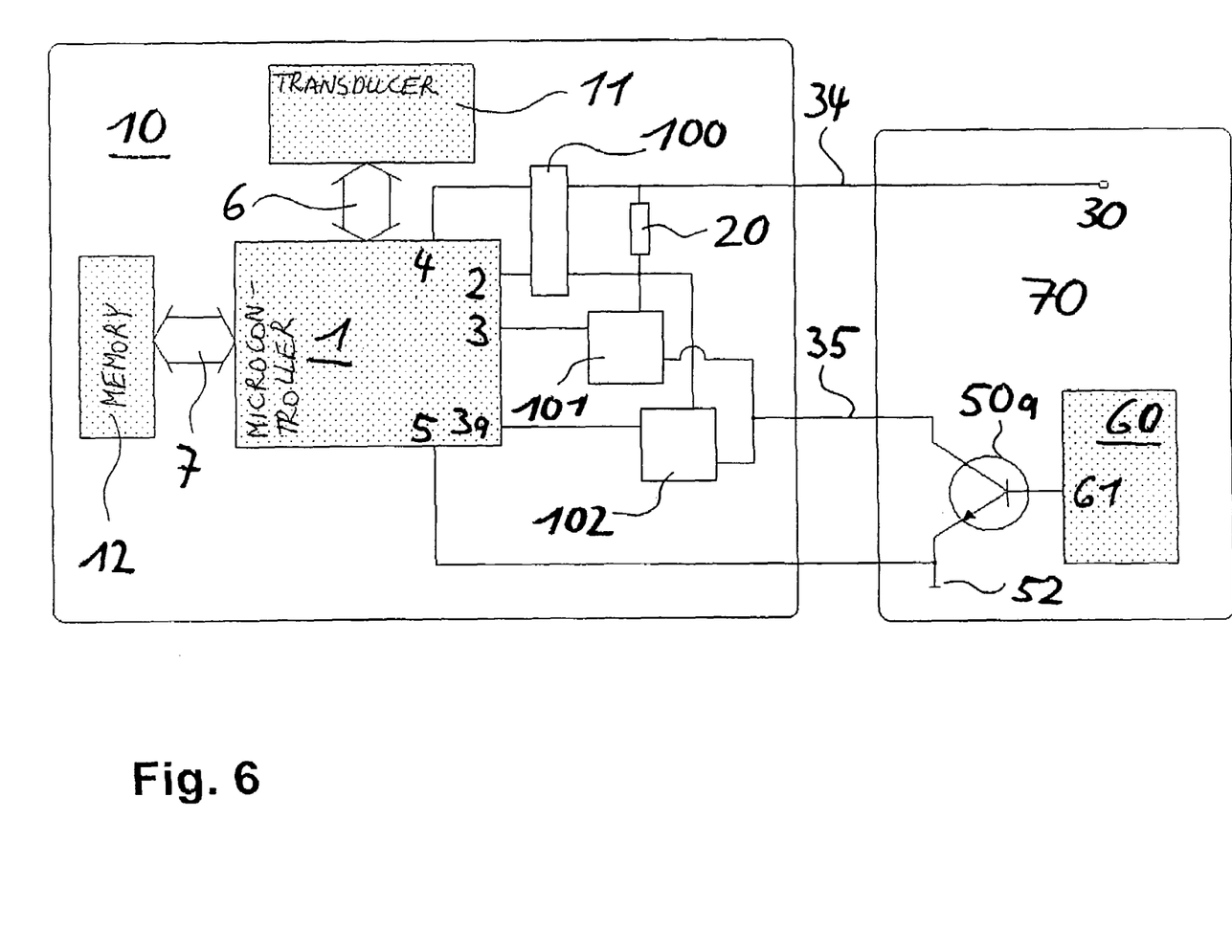

In an improvement of this embodiment of the invention, the input 2 of the electronic data processing means 1 as well as its supply voltage connection 4 are connected via suitable level transducers 100, so that the operating voltage of the system can be much higher than that of the electronic data processing means 1. Here, the electronic switches 101, 102 are advantageously configured in such a way that they can undertake a level adjustment.

Commercial Applicability:

The invention is commercially applicable especially for serial data communication between a sensor, such as an approximation switch, and a data processing means such as a programming device or microcontroller.

LIST OF REFERENCE NUMERALS 1 microcontroller
2, 2a interrupt inputs
3, 3a digital outputs
4 connection for supply voltage
5 connection for ground
6 bus connection to the memory
7 bus connection to the transducer
10 sensor
11 transducer
12 memory
20, 20a resistors
25 input line
30 voltage source
31 terminal
32 ground
33 intermediate switch
34 supply voltage line
35 output line
40 transistor
41 collector of the transistor
42 base of the transistor
43 emitter of the transistor
50 input switch
50a electronic input switch
52 control connection of the input switch
60 control logic circuit
61, 61a outputs of the control logic circuit
62 control logic circuit input
70 programming device
80, 80a electronic switch
81, 81a signal inputs of 80, 80a
82, 82a control inputs of 80, 80a
83, 83a signal inputs of 80, 80a
90, 90a input switches
91, 91a signal inputs of 90, 90a
92, 92a control inputs of 90, 90a
93, 93a signal inputs of 90, 90a
100 level transducer
101, 102 electronic switches

The invention claimed is:

1. A process for data communication with an electronic data processing means (1) that controls at least one electronic device (10), whereby said data processing means (1) has an input (2) and a digital output (3) via which data can be output and wherein a data processing program runs in a constant loop that cyclically queries whether a voltage is present at the input (2) that is higher or lower than a specified voltage value, whereby a voltage that is higher than the specified voltage value is applied via a resistor (20) to the input (2) that is connected via an input switch (50, 50*a*) to the ground (32) or to another voltage pole, so that a voltage drop at the resistor (20) is influenced by the switching state of the input switch (50, 50*a*) in such a way that the voltage present at the input (2) is higher than the specified voltage value when the input switch (50, 50*a*) is open and lower than the specified voltage value when the input switch (50, 50*a*) is closed, whereby the data processing program forms digital information on the basis of queries as to whether the voltage present at the input (2) is higher or lower than the specified voltage value, and said digital information can be output or it can control the electronic device (10), so that, by actuating the input switch (50, 50*a*), data can be input into the electronic data processing means (1), characterized in that the digital output (3) is connected to the control input (42) of an electronic switch (40) whose signal input (41) is connected to the input (2) and whose signal output (43) is connected to the ground (32) via the input switch (50, 50*a*), and the data input and the data output take place time-shifted vis-à-vis each other through a shared output line (35).

2. The process according to claim 1, characterized in that the electronic data processing means (1) has an interrupt means and the input (2) is an interrupt input, whereby the specified voltage value is selected in such a way that the interrupt means is in the active state when the input switch (50, 50*a*) is in one position and is not in the active state when the input switch (50, 50*a*) is in the other position.

3. The process according to claim 1, characterized in that the electronic device (10) is a sensor.

4. The process according to claim 1, characterized in that the electronic data processing means (1) is a microcontroller or a programmable logic circuit.

5. The process according to claim 1, characterized in that the electronic data processing means (1) has a digital output (3) and either a bipolar transistor (40) whose base (42) is connected to the digital output (3) of the electronic data processing means (1), whose collector (41) is connected to the input (2) and whose emitter is connected to the ground (32) via the input switch (50, 50*a*), or else it has a field effect transistor (40) whose gate terminal is connected to the digital output (3) of the electronic data processing means (1), whose drain terminal (41) is connected to the input (2) and whose source terminal (43) is connected to the ground (32) via the input switch (50, 50*a*).

6. The process according to claim 1, characterized in that the digital output (3) emits a high signal for a certain period of time, either immediately or for a certain duration every time the electronic data processing means (1) is switched on.

7. The process according to claim 1, characterized in that the digital output (3) emits a high signal of a specific duration at regular time intervals.

8. The process according to claim 1, characterized in that, by means of a previously unambiguously defined code, the electronic device (10) is set into the communication mode with the electronic data processing means (1).

9. The process according to claim 1, characterized in that, through the input of the appropriate data, the electronic data processing means (1) can be made to output data via the digital output (3).

10. The process according to claim 1, characterized in that the electronic data processing means (1) is equipped with a plurality of inputs (2), resistors (20), input lines (25) and input switches (50) by means of which data can be input in parallel.

11. The process according to claim 1, characterized in that the electronic data processing means (1) is equipped with a plurality of digital outputs (3) by means of which data can be output in parallel.

12. The process according to claim 10, characterized in that the electronic data processing means (1) has a plurality of electronic switches whose control inputs are each connected to one of the digital outputs (3) of the electronic data processing means (1), whose signal inputs are each connected to an input (2) and whose signal outputs are each connected to the ground (32) via an input switch (50, 50*a*).

13. The process according to claim 1, characterized in that the electronic data processing means (1) has a plurality of bipolar transistors (40), whose base (42) is connected to a digital output (3) of the electronic data processing means (1), whose collectors are each connected to an input (2) and whose emitters (43) are each connected to the ground (32) via an input switch (50, 50*a*), or else it has a plurality of field effect transistors (40) whose gate terminals are each connected to a digital output (3) of the electronic data processing means (1), whose drain terminals (41) are each connected to an input (2) and whose source terminals (43) are each connected to the ground (32) via an input switch (50, 50*a*).

14. The process according to claim 1, characterized in that the electronic data processing means (1) has a pair of antivalent outputs so that one of these outputs always emits a high signal when the other of these outputs emits a low signal and vice versa, whereby each of these outputs is connected to the control input of a dedicated electric or electronic switch, whereby the signal inputs of the two electric or electronic switches are connected to each other and to the input (2) of the electronic data processing means (1), and the signal outputs of the two electric or electronic switches are connected to each other and to the signal input of the input switch (50, 50*a*), in such a way that a high signal is always present at the control input of one of the two electric or electronic switches and data can always be sent to the input (2) of the electronic data processing means (1) by actuating the input switch (50, 50*a*).

15. The process according to claim 1, characterized in that the microcontroller (1) has two inputs (2, 2*a*) and two digital outputs (3, 3*a*) of which the first digital output (3) always emits a high-signal when the other digital output (3*a*) emits a low signal and vice versa, whereby each of the digital outputs (3, 3*a*) is connected according to a push-pull principle to the control input (82, 82*a*) of a dedicated electric or electronic switch (80, 80*a*), whereby the signal input (81) of the first electronic switch (80) is connected to the first input (2) and to the supply voltage (30) via a first resistor (20), and the signal input (81*a*) of the second electronic switch (80*a*) is connected to the second input (2*a*) and to the ground (32) via the second resistor (20*a*), whereby the signal output (83) of the first electronic switch (80) is connected to the signal output (83*a*) of the second electronic switch (80*a*) and, via the output line (35), to the signal inputs (91, 91*a*) of a first and a second input switch (90, 90*a*), whereby the signal output of the first input switch (90) is connected to the ground (32) and the signal output of the second input switch 90*a* is connected to the supply voltage (30), and the control inputs (91, 91*a*) of the input switch (90, 90*a*) are each actuated by a dedicated output (61, 61*a*) of the control logic circuit (60), so that data input is possible at any time, either via the first input (2), the first electronic switch (80) and the first input switch (90) or else via the second input (2*a*), the second electronic switch (80*a*) and the second input switch (90*a*).

16. The process according to claim 15, characterized in that, by measuring the current that flows through its outputs (61, 61*a*), the control logic circuit (60) automatically determines which of the two electronic switches (80, 80*a*) is currently open and ensures that only the appropriate input switch (90, 90*a*) is actuated during the data input.

17. A device for serial data communication with an electronic data processing means (1) that controls at least one electronic device (10), whereby said data processing means (1) has an input (2) and a digital output (3) via which data can be output and wherein a data processing program runs in a constant loop that cyclically queries whether a voltage is present at the input (2) that is higher or lower than a specified voltage value, whereby a voltage that is higher than a specified voltage value is applied via a resistor (20) to the input (2) that is connected via an input switch (50, 50*a*) to the ground (32), so that a voltage drop at the resistor (20) is influenced by the switching state of the input switch (50, 50*a*) in such a way that the voltage present at the input (2) is higher than the specified voltage value when the input switch (50, 50*a*) is open and lower than the specified voltage value when the input switch (50, 50*a*) is closed, whereby the data processing program forms digital information on the basis of queries as to whether the voltage present at the input (2) is higher or lower than the specified voltage value, and said digital information can be output or it can control the electronic device (10), 50 that, by actuating the input switch (50, 50*a*), data can be input into the electronic data processing means (1), characterized in that the digital output (3) is connected to the control input (42) of an electronic switch (40) whose signal input (41) is connected to the input (2) and whose signal output (43) is connected to the ground (32) via the input switch (50, 50*a*), and the data input and the data output take place time-shifted vis-á-vis each other through a shared output line (35).

18. The device according to claim 17, characterized in that the electronic data processing means (1) has an interrupt means and the input (2) is an interrupt input, whereby the specified voltage value is selected in such a way that the interrupt means is in the active state when the input switch (50, 50*a*) is in one position and is not in the active state when the input switch (50, 50*a*) is in the other position.

19. The device according to claim 17, characterized in that the electronic data processing means (1) has a digital output (3) and either a bipolar transistor (40) whose base (42) is connected to the digital output (3) of the electronic data processing means (1), whose collector (41) is connected to the input (2) and whose emitter is connected to the ground (32) via the input switch (50, 50*a*), or else it has an electric or electronic switch such as, for example, a field effect transistor (40) whose gate terminal is connected to the digital output (3) of the electronic data processing means (1), whose drain terminal (41) is connected to the input (2) and whose source terminal (43) is connected to the ground (32) via the input switch (50, 50*a*).

20. The device according to claim 17, characterized in that the electronic data processing means (1) comprises a microcontroller or a microprocessor or a programmable logic circuit.

21. The device according to claim 17, characterized in that the input switch (50, 50*a*) is an electronic input switch (50*a*) that is actuated by a control logic circuit (60).

22. The device according to claim 17, characterized in that the electronic device (10) is a sensor.

23. The device according to claim 17, characterized in that the electronic data processing means (1) is a microcontroller or a programmable logic circuit.

\* \* \* \* \*

UNITED STATES PATENT AND TRADEMARK OFFICE
CERTIFICATE OF CORRECTION

PATENT NO.         : 7,307,960 B2                                      Page 1 of 1
APPLICATION NO. : 10/239319
DATED              : December 11, 2007
INVENTOR(S)        : Achim Kuka and George Pfaff It is certified that error appears in the above-identified patent and that said Letters Patent is hereby corrected as shown below:

On Title Page
Item (73) Assignee should read: Pepperl & Fuchs GmbH, Mannheim (DE)

Signed and Sealed this

Sixth Day of May, 2008

JON W. DUDAS
*Director of the United States Patent and Trademark Office*